United States Patent
Hsiung

[11] Patent Number: 5,971,416
[45] Date of Patent: Oct. 26, 1999

[54] BICYCLE SHOCK ABSORBING ARRANGEMENT

[76] Inventor: Kao Fu Hsiung, No. 230, Sec.2, Chang Nan Road, Changhua City, Changhua Hsien, Taiwan

[21] Appl. No.: 08/898,150

[22] Filed: Jul. 22, 1997

[30] Foreign Application Priority Data

Aug. 5, 1996 [TW] Taiwan .................................. 96218017

[51] Int. Cl.⁶ .................................................. B62K 3/02
[52] U.S. Cl. .......................................... 280/283; 280/288
[58] Field of Search ........................... 280/284, 283, 280/288; 180/227

[56] References Cited

U.S. PATENT DOCUMENTS

| 583,345 | 5/1897 | Travis | 280/284 |
|---|---|---|---|
| 615,054 | 11/1898 | Watson | 280/283 |
| 625,456 | 5/1899 | Mills | 280/284 |
| 634,340 | 10/1899 | Harnett | 280/283 |
| 644,788 | 3/1900 | Williams | 280/284 |
| 644,957 | 3/1900 | Williams | 280/284 |
| 657,667 | 9/1900 | Mills | 280/283 |
| 1,071,892 | 3/1913 | Diepenhorst | 280/284 |
| 5,316,327 | 5/1994 | Blanchard | 280/284 |
| 5,658,001 | 8/1997 | Blanchard | 280/284 |

FOREIGN PATENT DOCUMENTS

| 1061547 | 4/1954 | France . |
|---|---|---|
| 175976 | 10/1905 | Germany . |

*Primary Examiner*—Lanna Mai
*Assistant Examiner*—Andrew J. Fischer
*Attorney, Agent, or Firm*—Rosenberg, Klein & Bilker

[57] ABSTRACT

A bicycle shock absorption system is provided. The shock absorption system includes a frame having an axially extended bracket portion for coaxially supporting the bicycle's chain wheel; at least one elongate chain stay extending between the bicycle's rear hub sprocket and the frame's bracket portion; and, a revolving shaft for pivotally coupling the chain stay to the bracket portion. The revolving shaft is coupled in coaxially rotatable manner to the bracket portion, and includes a pair of axially offset locating ring portions disposed respectively adjacent the axially opposed bracket ends of the bracket portion. The locating rings serve to stop a relative axial displacement of the adjacent bracket end. The revolving shaft is secured to one end of the chain stay.

3 Claims, 8 Drawing Sheets

BICYCLE SHOCK ABSORBING ARRANGEMENT

BACKGROUND OF THE INVENTION

The present invention relates to the arrangement of the shock absorbing structure of a bicycle, and relates more particularly to such a bicycle shock absorbing arrangement which constantly keeps the chain and the chain wheel in positive engagement.

Figure 1:
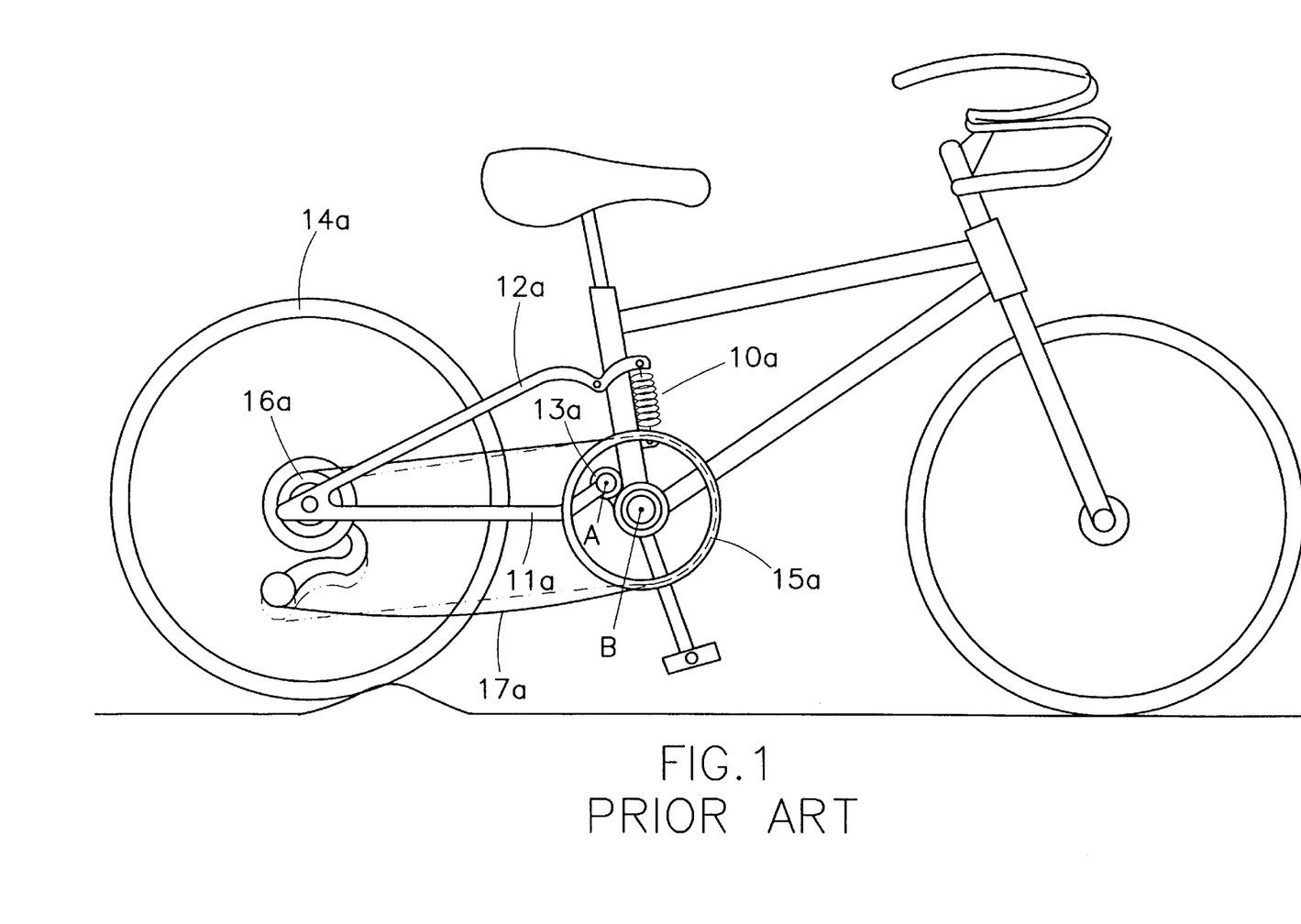
FIG. 1 shows a bicycle shock absorbing system according to the prior art.

FIG. 1 shows a conventional bicycle shock absorbing system in which the rear ends of the chain stays 11a and the seat stays 12a are respectively connected together and pivoted to the rear hub sprocket 16a; the front end of the chain stays 11a is pivoted to a pivot A at a pivot holder 13a; the front end of the seat stays 12a is supported on a shock absorbing spring 10a at the seat tube of the bicycle. When the rear wheel 14a runs over an uneven road, the chain stays 11a is forced by the rear wheel 14a to turn about the pivot A, and the seat stays 12a is forced to act against the shock absorbing spring 10a, causing the shock absorbing spring 10a to absorb shock waves. This shock absorbing structure is still not satisfactory in function. Because the pivot A and the bottom bracket bearing axle B of the chain wheel 15a are disposed at different locations, the chain stays 11a is turned about the pivot A but not about the bottom bracket bearing axle B when the rear wheel 14a runs over an uneven road, thereby sing the distance between the chain wheel 15a and the rear hub sprocket 16a to be changed. When the distance between the chain wheel 15a and the rear hub sprocket 16a is changed, the tension of the chain 17a will be relatively changed, causing a transmission error. Furthermore, because the pivot holder 13a support the chain stays 11a, it tends to be damaged when the chain stays 11a is forced to vibrate.

SUMMARY OF THE INVENTION

The present invention has been accomplished to provide a bicycle shock absorbing system which eliminates the aforesaid problems. According to the present invention, the front end of the chain stays is welded to two opposite ends of a hollow revolving shaft, which is revolvably mounted within the barrel-like bottom bracket of the bicycle to hold the bottom bracket bearing axle; two locating rings are welded to the hollow revolving shaft outside the barrel-like bottom bracket to prohibit the hollow revolving shaft from axial movement relative to the barrel-like bottom bracket. Because the chain stays is connected to the hollow revolving shaft, which is coaxially mounted in the barrel-like bottom bracket, the distance between the rear hub sprocket and the chain wheel will never change.

DETAILED DESCRIPTION OF THE PREFERRED EMBODIMENT

Figure 2:
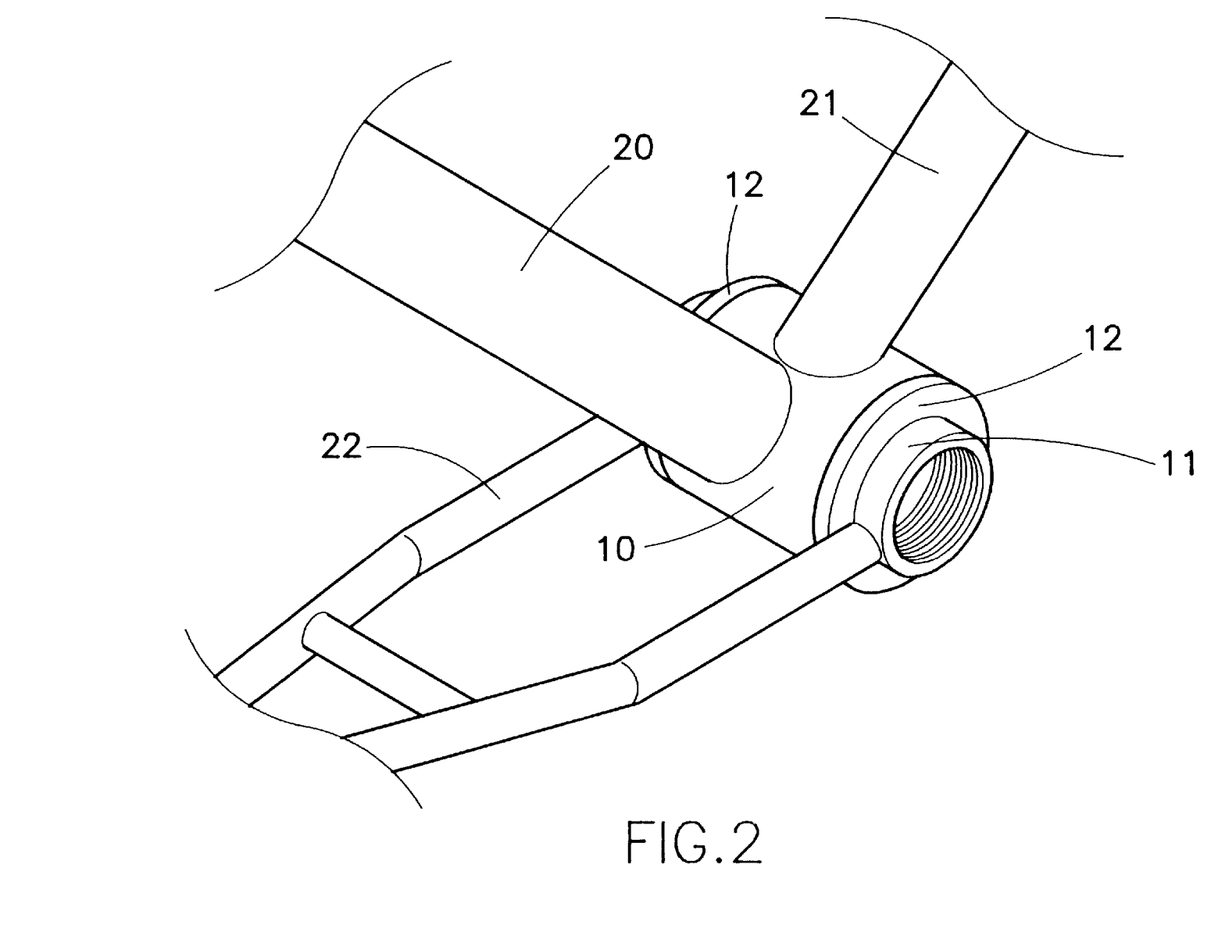
FIG. 2 is an elevational view of a bicycle shock absorbing arrangement according to the present invention.
Figure 3:
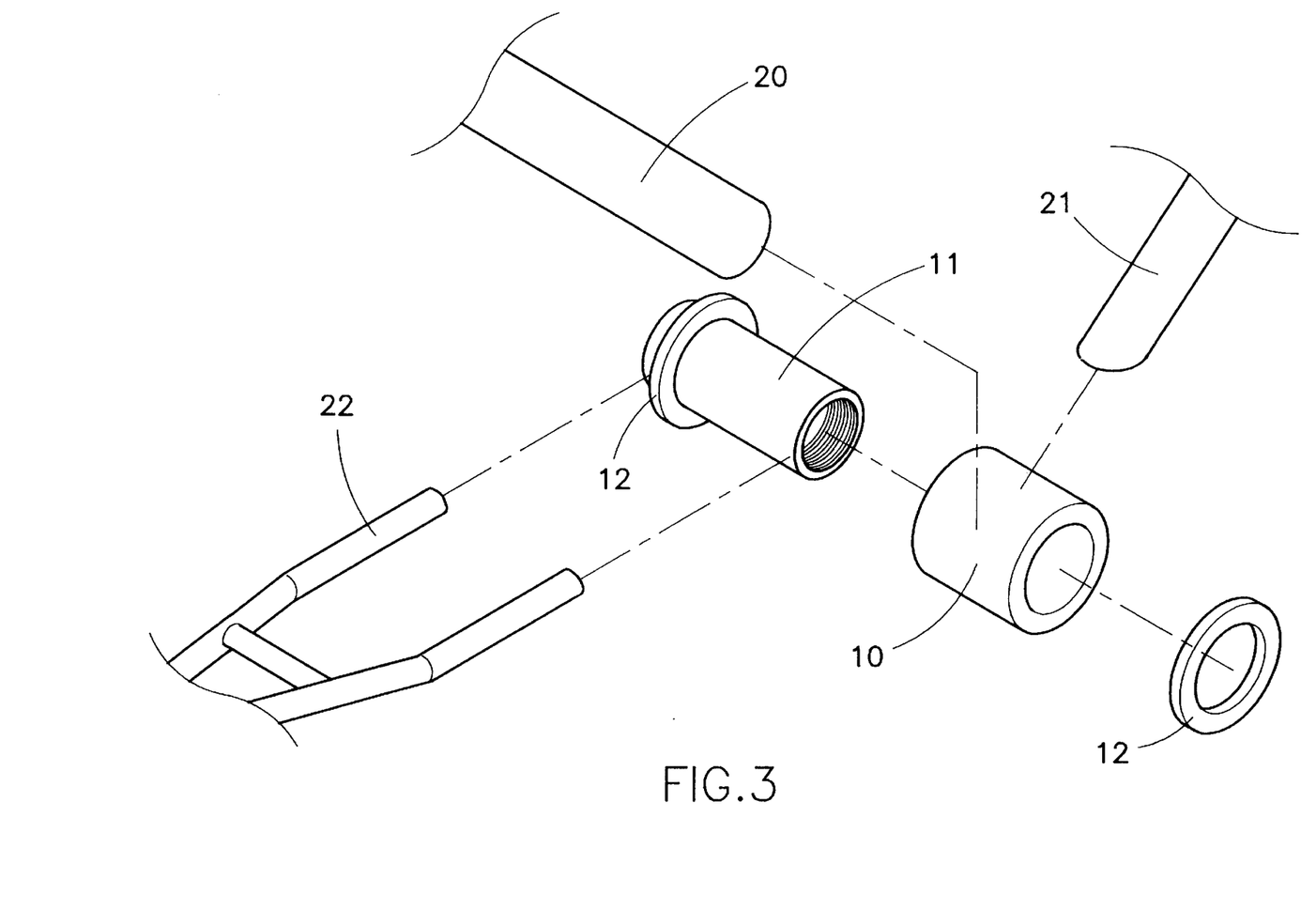
FIG. 3 is an exploded view of the bicycle shock absorbing arrangement shown in FIG. 2.

Referring to FIGS. 2 and 3, a hollow revolving shaft 11 is revolvably mounted in the barrel-like bottom bracket 10. Two locating rings 12 are welded to the hollow revolving shaft 11 near two opposite ends, and stopped outside the bottom bracket 10 to prohibit the hollow revolving shaft 11 from axial movement relative to the bottom bracket 10. The seat tube 20 and the bottom tube 21 of the bicycle are respectively connected to the bottom bracket 10. The chain stays 22 is connected to two opposite ends of the hollow revolving shaft 11.

Figure 4:
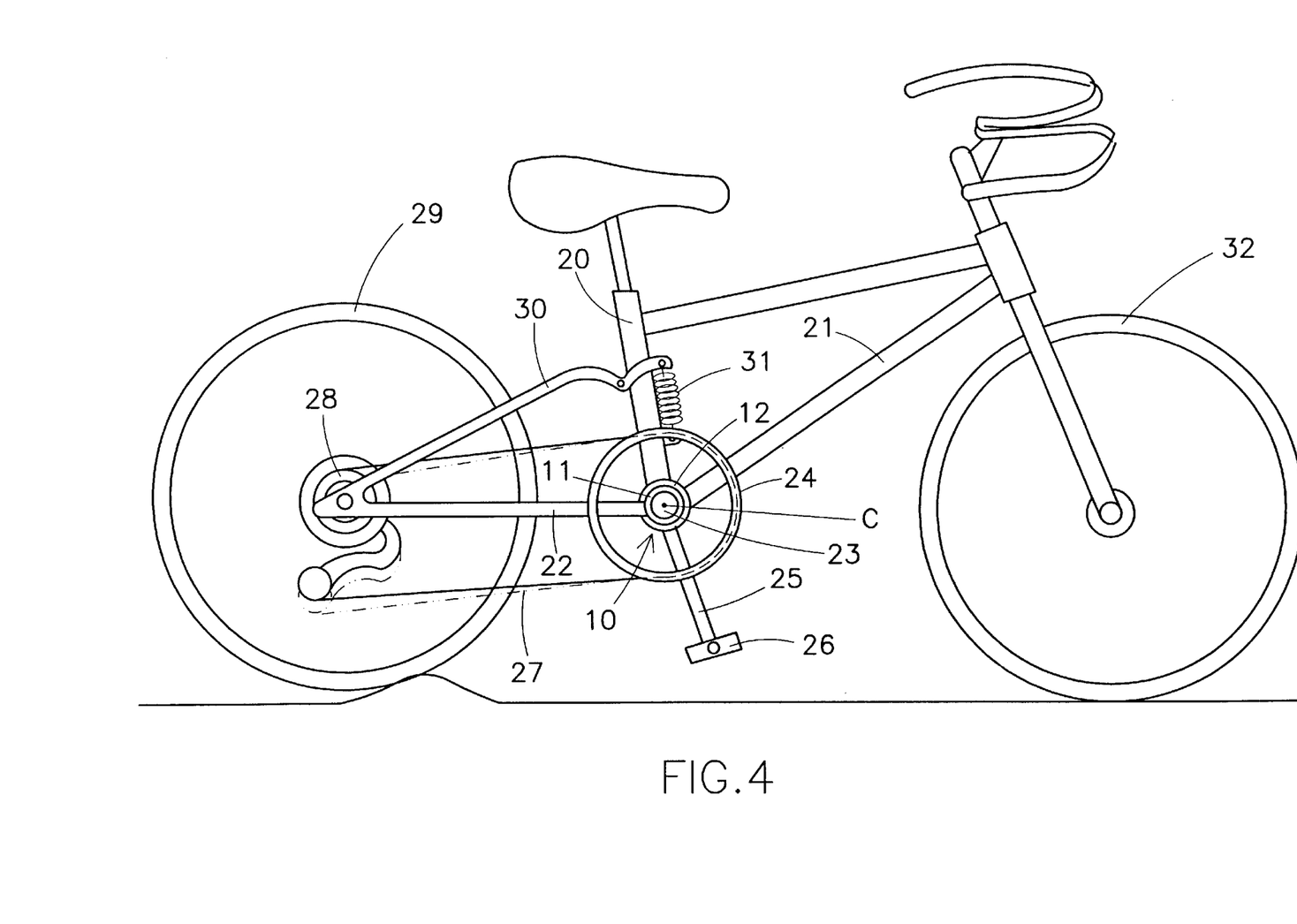
FIG. 4 is a plain view of the bicycle shock absorbing system according to the present invention.

Referring to FIG. 4 and FIGS. 2 and 3 again, the seat tube 20 and the bottom tube 21 are respectively welded to the bottom bracket 10; the front end of the chain stays 22 is connected to the two opposite ends of the hollow revolving shaft 11; the hollow revolving shaft 11 holds the bottom bracket bearing axle 23 to which the chain wheel 24 and the cranks 25 with the pedals 26 are connected; the front end of the seat stays 30 is supported on a shock absorbing spring 31 at the seat tube 20. When the pedals 26 are pedaled to turn the chain wheel 24, the rear hub sprocket 28 is rotated by the chain 27 to turn rear wheel 29, thereby causing the front wheel 32 and the rear wheel 29 moved. Because the bottom bracket 10 and the hollow revolving shaft 11 have the same longitudinal axis C and the chain stays 22 is turned about this axis C, the distance between the rear hub sprocket 28 and the chain wheel 24 never changes, i.e., the tension of the chain 27 is constantly maintained at the same level. Furthermore, because the hollow revolving shaft 11 can be turned within the bottom bracket 10, it lessens shock waves from the chain stays 22.

Figure 5:
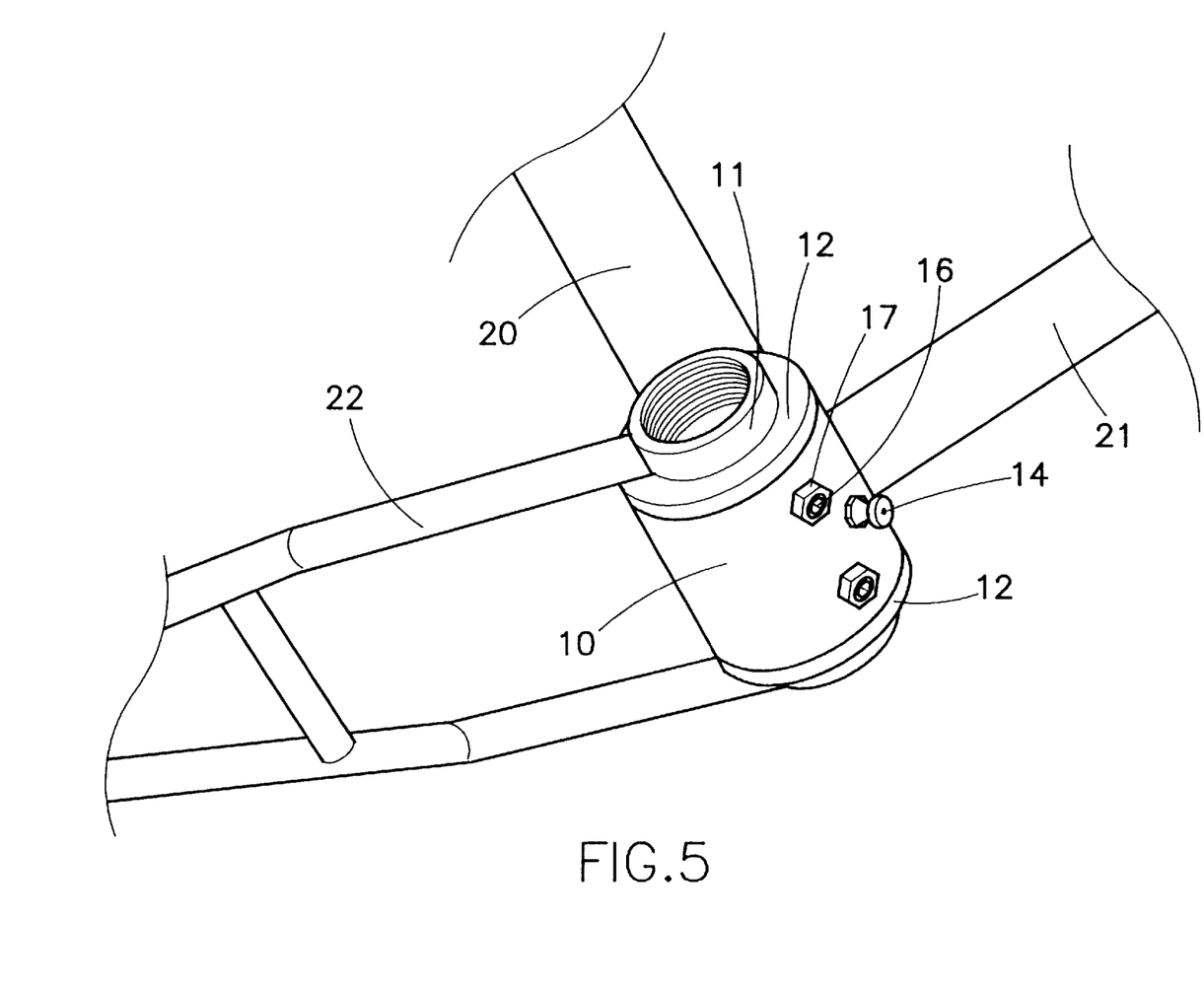
FIG. 5 is an elevational view of an alternate form of the bicycle shock absorbing arrangement of the present invention.
Figure 6:
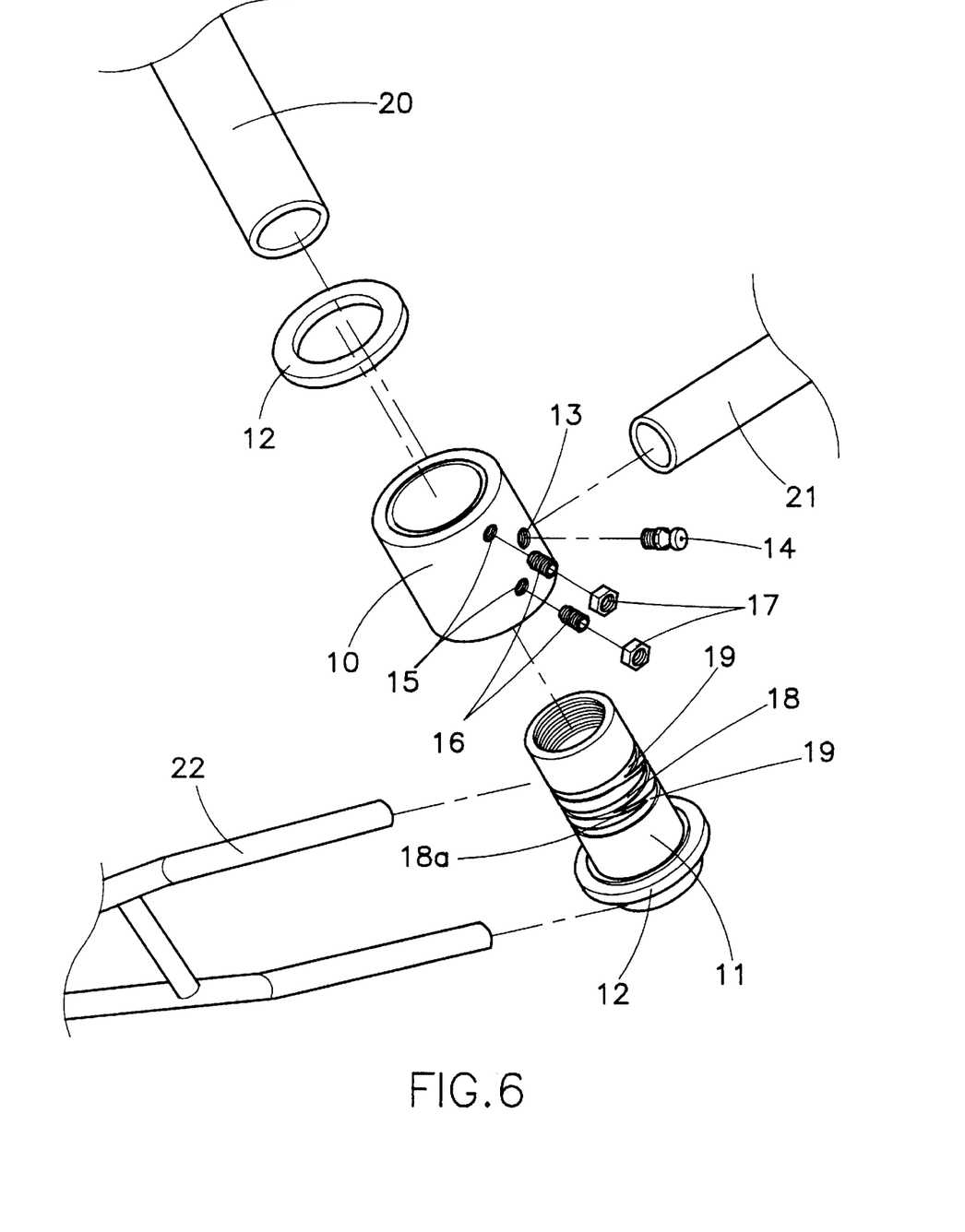
FIG. 6 is an exploded view of the bicycle shock absorbing arrangement shown in FIG. 5.
Figure 7:
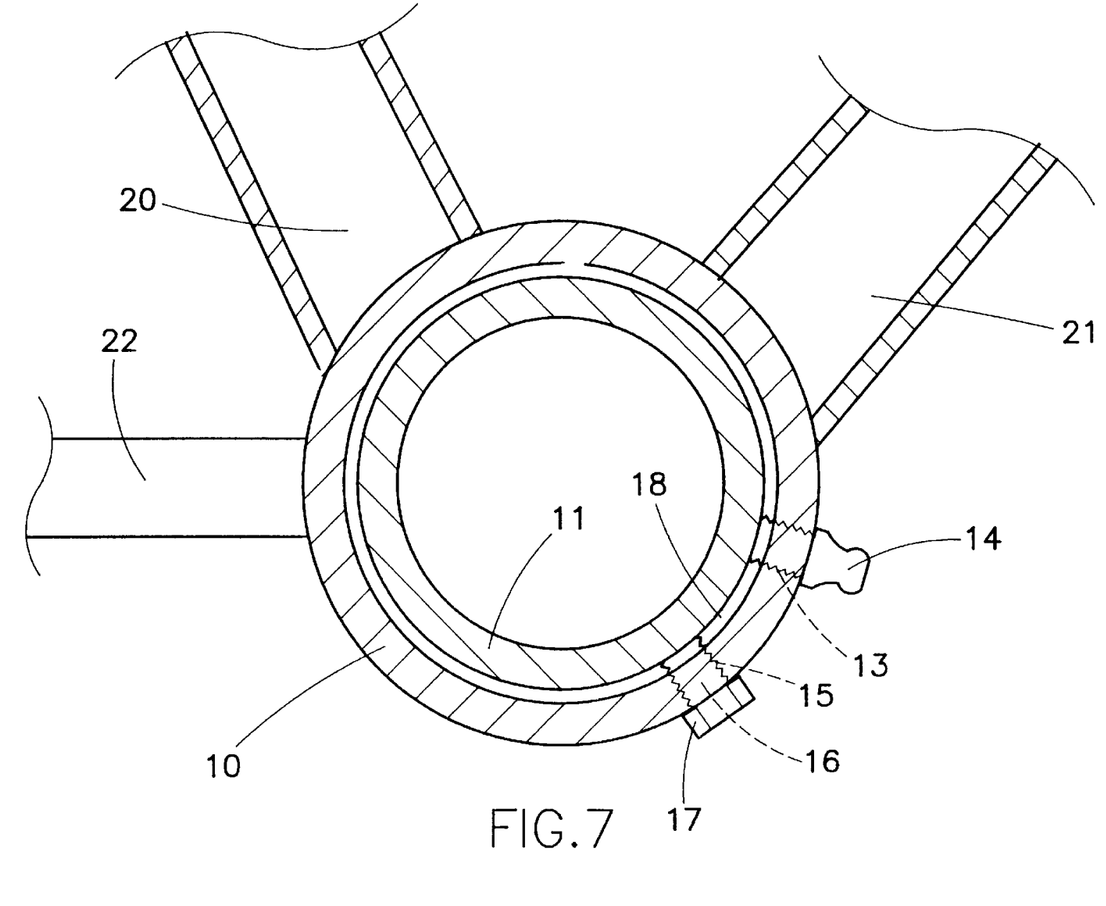
FIG. 7 is a sectional plain view in an enlarged scale of the bicycle shock absorbing arrangement shown in FIG. 5.
Figure 8:
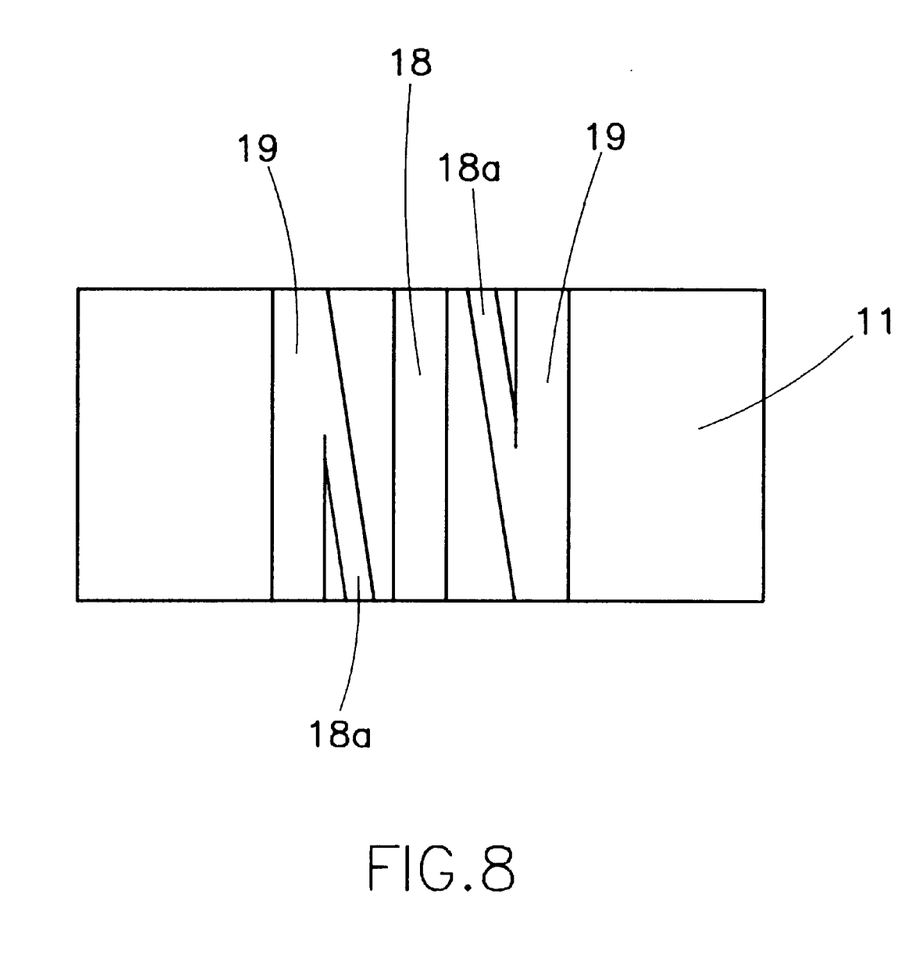
FIG. 8 is a plain view of the revolving shaft shown in FIG. 5.

FIGS. from 5 to 7 show an alternate form of the present invention, in which the revolving shaft 11 has two outer annular grooves 19 disposed around the periphery, an intermediate annular groove 18 disposed around the periphery and spaced between the outer annular grooves 19, and a guide groove 18a disposed in communication between the outer annular grooves 19 and the intermediate annular groove 18; the barrel-like bottom bracket 10 has two locating screw holes 15 respectively disposed corresponding to the outer annular grooves 19 of the revolving shaft 11, and an oil feeding nozzle mounting screw hole 13 disposed corresponding to the intermediate annular groove 18; two locating screws 16 are respectively threaded into the locating screw holes 15 and projecting into the outer annular grooves 19 of the revolving shaft 11 to stop the revolving shaft 11 from axial movement relative to the barrel-like bottom bracket 10 without prohibiting the revolving shaft 11 from rotary motion relative to the barrel-like bottom bracket 10; two nuts 17 are respectively threaded onto the locating screws 16 to fix them in place; an oil feeding nozzle 14 is threaded into the oil feeding nozzle mounting screw hole 13 for the application of a lubricating oil to the annular grooves 18, 19.

It is to be understood that the drawings designed for purposes of illustration only, and are not intended as a definition of the limits and scope of the invention disclosed.

What the invention claimed is:

1. A shock absorption system for a chain-driven pedaled vehicle having an endless chain carried on a chain wheel and a rear hub sprocket comprising:

(a) a frame including an axially extended bracket portion for coaxially supporting the chain wheel, said bracket portion having formed therein an axially extended bore and axially opposed bracket ends;

(b) at least one elongate chain stay having first and second ends, said first end supporting the rear hub sprocket; and, (c) a revolving shaft for pivotally coupling said chain stay to said bracket portion of said frame, said revolving shaft being coupled in coaxially rotatable manner to said bracket portion, said revolving shaft having a pair of axially offset locating ring portions disposed respectively adjacent said bracket ends for stopping a relative axial displacement thereof, said revolving shaft being secured to said second end of said chain stay, said revolving shaft including a substantially tubular intermediate portion extending axially between said locating ring portions, said intermediate portion being coaxially disposed within said bore of said bracket portion, said intermediate portion of said revolving shaft having formed thereon a pair of axially offset outer annular grooves and an intermediate annular groove disposed therebetween, each said outer annular groove communicating with said intermediate annular groove through a guide groove extending therebetween.

2. The shock absorption system as recited in claim 1 wherein said bracket portion of said frame has formed therein at least one oil feeding nozzle mounting hole and at least a pair of locating screw holes, said oil feeding nozzle mounting hole being disposed in open communication with said intermediate annular groove of said said revolving shaft intermediate portion, said locating screw holes being respectively disposed in open communication with said outer annular grooves of said revolving shaft intermediate portion.

3. The shock absorption system as recited in claim 2 wherein said bracket portion of said frame further includes:

(a) at least a pair of locating screws passing through said locating screw holes to respectively engage said outer annular grooves of said revolving shaft intermediate portion;

(b) at least a pair of locking nuts threadedly coupled respectively to said locating screws; and, (b) an oil feeding nozzle threadedly coupled to said oil feeding nozzle mounting hole;

whereby said revolving shaft is retained with said bore of said bracket portion substantially in linearly fixed yet angularly displaceable manner.

\* \* \* \* \*